United States Patent [19]

Dingwall

[11] Patent Number: 5,721,922
[45] Date of Patent: Feb. 24, 1998

[54] EMBEDDING A REAL-TIME MULTI-TASKING KERNEL IN A NON-REAL-TIME OPERATING SYSTEM

[75] Inventor: Thomas J. Dingwall, Portland, Oreg.

[73] Assignee: Intel Corporation, Santa Clara, Calif.

[21] Appl. No.: 323,044

[22] Filed: Oct. 13, 1994

[51] Int. Cl.⁶ .......................................................... G06F 9/46
[52] U.S. Cl. ........................... 395/673; 395/677; 395/572; 395/806; 395/826; 395/840; 395/856; 395/868
[58] Field of Search ........................................ 395/650, 673, 395/677, 872, 806, 826, 840, 856, 868; 364/280, 281.3

[56] References Cited

U.S. PATENT DOCUMENTS

| | | | |
|---|---|---|---|
| 5,081,577 | 1/1992 | Hatle | 395/827 |
| 5,414,848 | 5/1995 | Sandage et al. | 395/650 |
| 5,469,571 | 11/1995 | Bunnell | 395/700 |
| 5,515,538 | 5/1996 | Kleiman | 395/733 |
| 5,528,513 | 6/1996 | Vaitzblit et al. | 364/514 A |

*Primary Examiner*—Lucien U. Toplu
*Attorney, Agent, or Firm*—Blakely, Sokoloff, Taylor & Zafman

[57] ABSTRACT

The invention provides a method and apparatus for embedding a real-time multi-tasking kernel in a non-real-time operating system. Through encapsulating a real-time kernel into the interrupt handling environment of a non-real-time graphical user interface, such as Windows®, the method of the present invention allows for an entire real-time environment to be supported within the graphical user interface. The scheduler of the real-time kernel supports multiple threads of execution all running at higher priority than the graphical user interface tasks. By using synchronization mechanisms of the graphical user interface, e.g. VxD events in enhanced mode Windows®, the real-time tasks are able to make use of system services of the graphical user interface.

36 Claims, 3 Drawing Sheets

EMBEDDING A REAL-TIME MULTI-TASKING KERNEL IN A NON-REAL-TIME OPERATING SYSTEM

BACKGROUND OF THE INVENTION

1. Field of the Invention

The present invention relates to the field of real-time multi-tasking. More particularly, the present invention relates to a method and apparatus for embedding a real-time multi-tasking kernel in a non-real-time operating system.

2. Background of the Invention

Video conferencing and personal computer (PC) applications which deal with communications and natural data types, i.e., audio and video data, require real-time interrupt handling and task scheduling. The user will hear clicks and pops from audio data output and see modulating or jerky video output, if there is a delay in the capture or playback of audio or video data. Furthermore, playback of audio and video data must be synchronized with each other to appear natural.

FIG. 1 illustrates the real-time processing of natural data types. Natural data types require real-time response for presentation and capture. The audio and video data must be transmitted to and from external output devices in a timely manner. In step 10, data from an audio/video file on disk is read to a memory buffer. The memory buffer is then transferred to a playback device by an interrupt service routine in step 12, in response to hardware interrupts by the playback device.

In step 14, the interrupt service routine signals the task to refill the memory buffer, as data in the memory are transferred to the playback device. In step 16, the task reads more data from the audio/video file on disk. If there is excessive delay in the data transfer from the memory buffer to the playback device or from disk to the memory buffer, a noticeable click or a pop in the playback of the audio/video data is produced. Such delay is called interrupt and/or a task latency. Interrupt latency is the delay between a hardware interrupt signal and the execution of the first instruction of an interrupt handler. Task latency is the delay between a highest priority task becoming ready for execution and actually beginning execution.

In many graphic user interface environments, e.g. Windows® (Windows® is a registered trademark of Microsoft Corporation of Redmond, Wash.), if audio or video playback alone is being executed, a system processing the natural data types will produce a smooth playback output. However, other operations being performed on a system processing the natural data types, such as spreadsheet and networking activities, as well as transmission of electronic mail (E-mail), can disrupt the scheduling of the audio and video playback. Such disruptions may cause the audio and video playback to manifest pops, clicks and/or jerky video output. In addition, playback of both audio as well as video data may produce an unnatural output due to lack of synchronization of the natural data types.

It is desirable to have a method and apparatus for allowing real-time programming with support for the presentation of natural data types, without allowing other operations to disrupt the delivery and playback of the audio and video data.

SUMMARY OF THE INVENTION

The invention provides a method and apparatus for embedding a real-time multi-tasking kernel in a non-real-time operating system. Through encapsulating a real-time kernel into the interrupt handling environment of a non-real-time graphical user interface, such as Windows®, the method of the present invention allows for an entire real-time environment to be supported within the graphical user interface. The scheduler of the real-time kernel supports multiple threads of execution all running at higher priority than the graphical user interface tasks. By using synchronization mechanisms of the graphical user interface, e.g. VxD events in enhanced mode Windows®, the real-time tasks are able to make use of system services of the graphical user interface.

The method and apparatus of the present invention allows real-time programming with support for the presentation of natural data types, without allowing other operations to disrupt the delivery and playback of the audio and video data. The method and apparatus of the present invention is also applicable in communications.

DETAILED DESCRIPTION OF THE INVENTION

Apparatus and methods for embedding a real-time multi-tasking kernel in a non-real-time operating system are disclosed. The present invention utilizes the VxD environment in Windows® to provide real-time interrupt handling and task scheduling for personal computer applications dealing with communications and natural data types.

Figure 1:
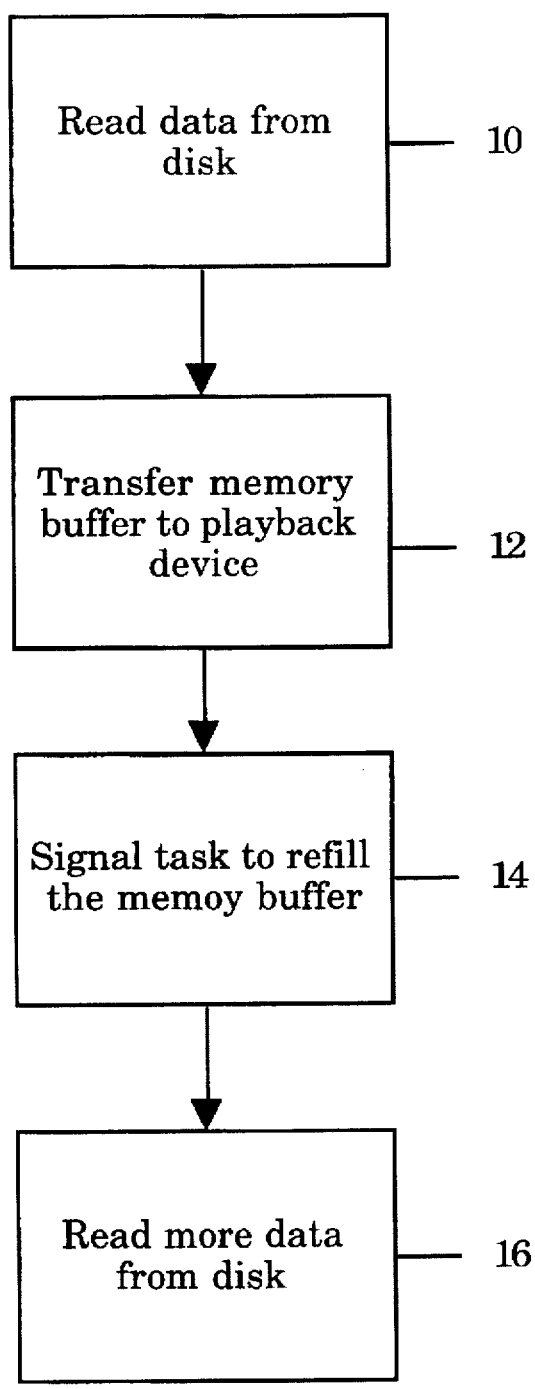
FIG. 1 illustrates real-time processing of natural data types.
Figure 2:
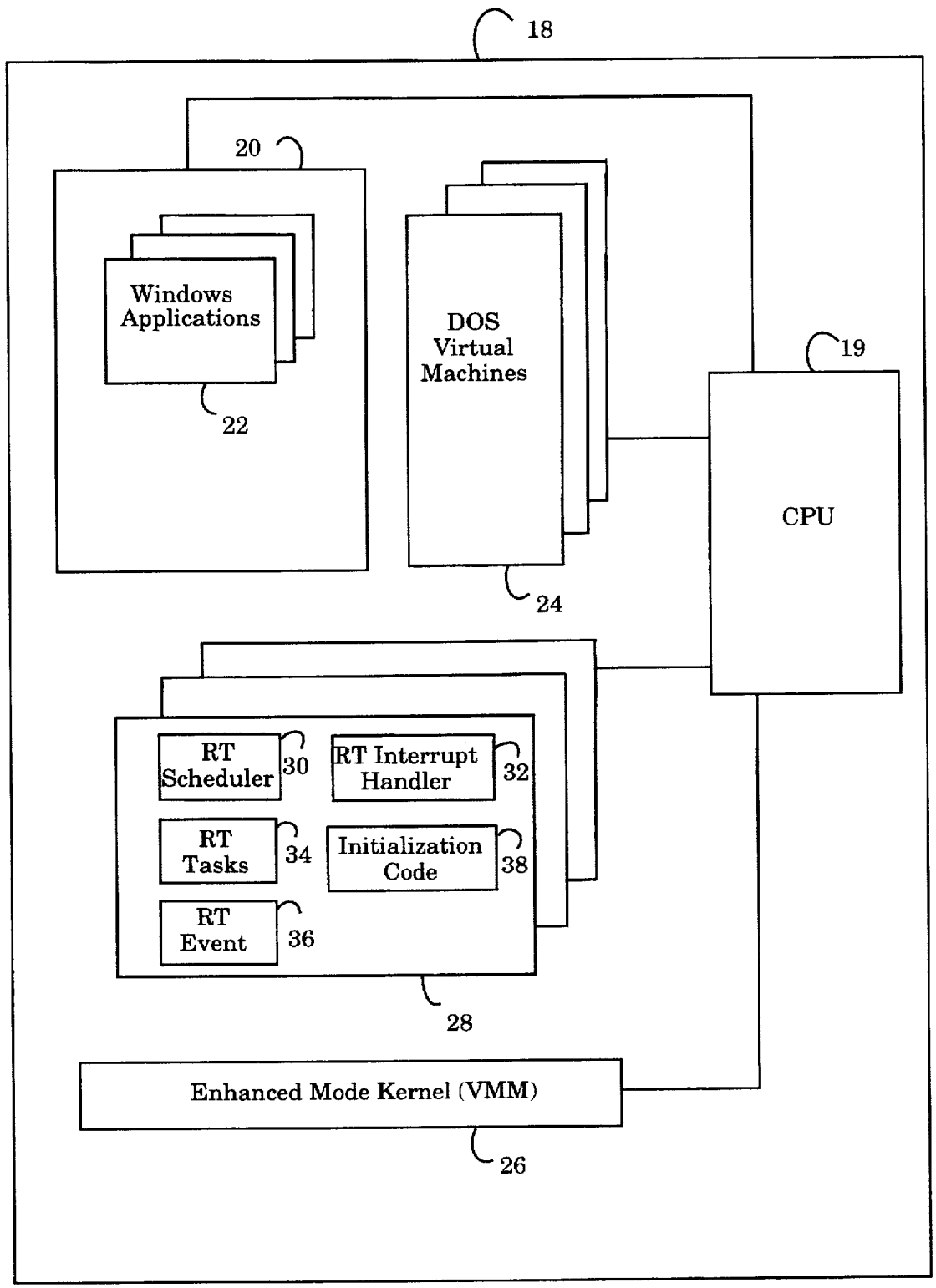
FIG. 2 programming environments in Windows®.

FIG. 2 illustrates a Windows® VxD programming environment as a preferred embodiment of the present invention. CPU 19 of computer 18 controls the operations of: system virtual machine 20, a set of DOS virtual machines 24, virtual machine manager (VMM) 26, and a set of virtual device drivers (VxDs) 28. Windows® applications 22, including dynamic link libraries execute in system virtual machine 20. In the system virtual machine environment, applications are scheduled in a cooperative multi-tasking manner. Because of the cooperative nature of the scheduling mechanism, real-time response cannot be guaranteed for any given application.

In contrast, DOS virtual machines 24, and system virtual machine 20 in it's entirety, are scheduled preemptively by enhanced mode VMM 26. Although the scheduling of virtual machines is preemptive, VMM 26 emphasizes user responsiveness, rather than the real-time response requirements of particular virtual machines. As a result, the DOS virtual machine environment 24 does not provide satisfactory real-time response for natural data type processing, although it does provide better response than the cooperative environment in which Windows® applications are scheduled.

The virtual device driver (VxD) environment of Windows®, supported by VMM 26, provides sufficient interrupt response for communications and natural data type processing. VxDs are thirty-two bit dynamic link libraries running at the most privileged level (ring 0) of CPU 19. The VxD environment, however, is totally interrupt-driven. There is no notion of tasks or task scheduling in this environment. Because of this, the standard VxD environment is very difficult to use for communications natural data type processing. The present invention presents a method for embedding a real-time scheduler into a VxD, in order to provide real-time multi-tasking for communication and natural data type applications.

The method of the present invention for supporting real-time multi-tasking consists of VxD 28, containing real-time scheduler (RT scheduler) 30, application specific interrupt handlers 32, real-time tasks (RT Tasks) 34, event 36, and VxD initialization code 38. One of the real-time tasks, referred to as an idle task, is dedicated to context switching between Windows® and real-time VxD, and has the lowest priority of any task scheduled by real-time scheduler 30.

A real-time scheduler 30 for use in the present invention has three capabilities. First, it is capable of scheduling tasks preemptively by priority. Secondly, the real-time scheduler 30 allows interrupt handlers 32 to make real-time tasks 34 ready for execution without preemption occurring (i.e., it supports a scheduling lock). Thirdly, the real-time scheduler 30 allows the scheduling lock to be released causing any high priority, ready real-time tasks to preempt the current process.

Initialization of this environment proceeds as follows: VxD initialization code 38 is invoked by VMM 26 during system initialization. This initialization code 38 invokes the initialization entry point of RT scheduler 30. In response, RT scheduler 30 creates an idle task and associates the context of the calling thread with the idle task. RT scheduler 30 then returns to VxD initialization code 38. At this point there is a single task, the idle task, within the real-time environment.

Initialization code 38 may then create other, application-specific tasks. For example, initialization code 38 may create a task to perform capture or playback of audio/video. Because such application-specific tasks are higher priority than the idle task, scheduler 30 will preempt the idle task in order to execute another task as soon as it is created. Each application-specific task performs initialization of its application when it starts. The example task might initialize its audio/video device, including installing RT interrupt handler 32, to service the device. The example task might also install another RT interrupt handler to service software interrupts, generated by Windows® applications wishing to communicate with the application-specific task. Eventually, each application specific task will complete initialization, and block. For instance, the example application would block waiting for the audio/video device to complete an operation or for a Windows® application to communicate with the task. When all application-specific tasks complete execution and block, the idle task will again be executed. The idle task executes VxD initialization code 38, which then returns to VMM 26. At this point the entire real-time environment 28, including all its tasks has initialized. VMM 26 may now complete initialization of the rest of the system, allowing the computer to begin normal operation.

Figure 3:
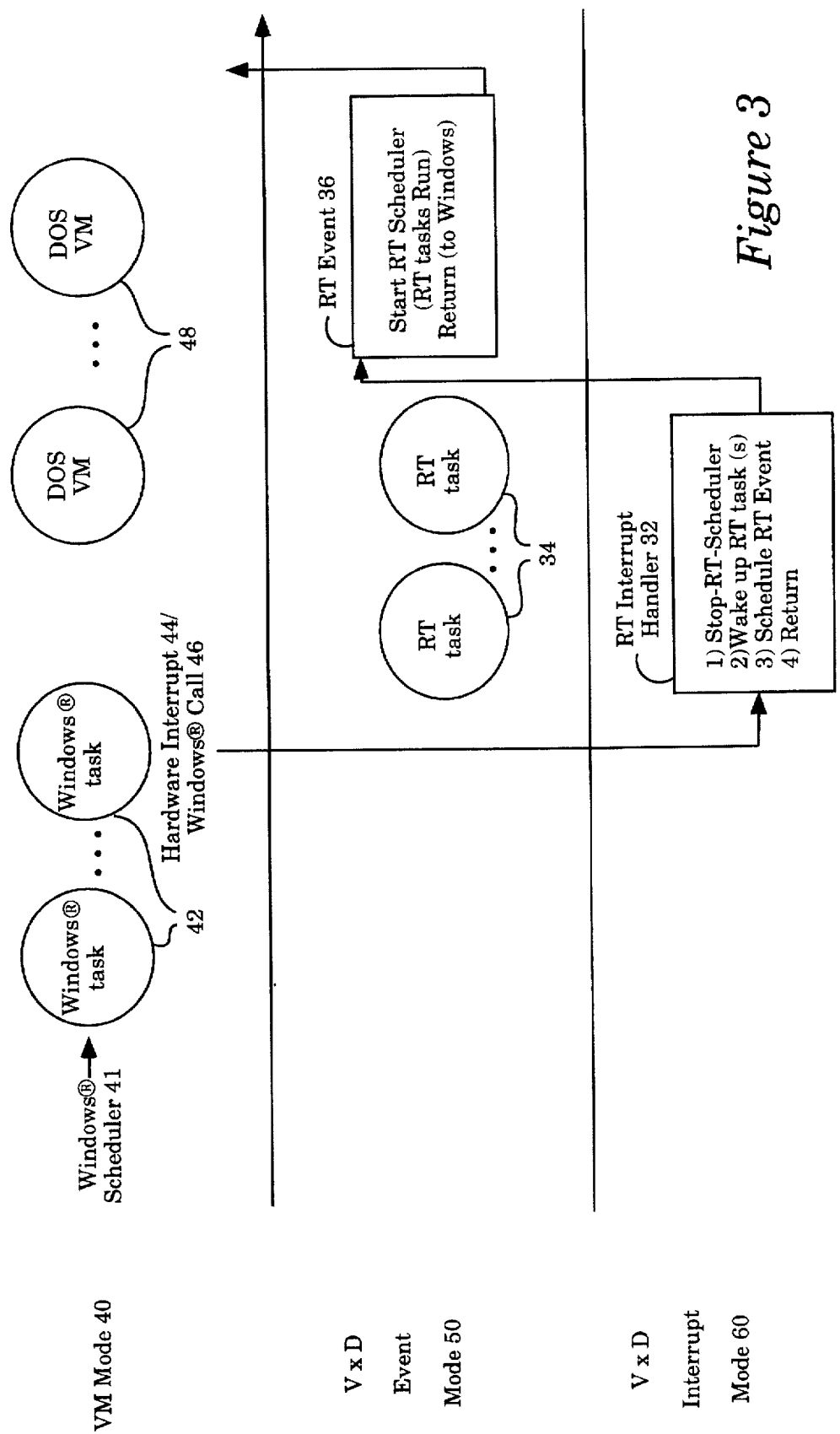
FIG. 3 illustrates real-time interrupt handling and task scheduling in a VxD environment.

FIG. 3 illustrates the sequence of events for the present invention during normal system operation. References will be made to elements described in FIG. 2. Virtual Machine (VM) mode 40 represents the phase of system operation when virtual machines are executing. VM mode 40 includes the execution of both DOS virtual machines 24 and system virtual machine 22, in which Windows® applications execute. VxD event mode 50 represents the phase of system operation when the VMM 26 executes events. In particular, VxD event mode 50 represents the time when RT event 34 is executing. VxD interrupt mode 60 represents the phase of system operation when VMM 26 or VxD interrupt handlers are executing. In particular it represents the time when RT interrupt handlers 32 are executing.

Normally, the system will be executing within a virtual machine, either a DOS VM or the system virtual machine. VMM 26 schedules virtual machines, and the Windows® kernel schedules Windows® applications within the system VM, all without any knowledge of RT scheduler 30. RT scheduler 30 remains inactive, with its state indicating that the idle task is running and all other RT task 34 are asleep.

At some point, an interrupt occurs which causes the processor to switch to VxD interrupt mode 60 and execute RT interrupt handler 32. For the example application it is assumed that the hardware interrupt handler servicing the audio/video device is invoked. (Operation is identical for the case of a software interrupt from a Windows® application.) As part of servicing the interrupt, RT interrupt handler 32 may need to wake up its associated task. For example, the audio/video device may have completed filling a buffer with data which the task needs to process. To signal RT task 34, RT interrupt handler 32: 1) locks scheduling to prevent RT scheduler 30 from switching tasks; 2) wakes up the RT task; 3) schedules execution of RT event 36 with the virtual machine manager, and 4) return. Since scheduling is locked, the RT scheduler 30 will not switch tasks, even though the newly-awakened real-time task is higher priority than the (currently-executing) idle task.

Upon returning, VMM 26 gains control. It invokes RT event handler 36 as soon as it is safe to do so. If the interrupt occurred while the system was in VM mode 40 or VxD event mode 50, the event will be executed immediately. If the interrupt occurred while the system was in VxD interrupt mode 60, invocation of the newly scheduled event is delayed until the system is ready to leave VxD interrupt mode 60.

Whenever RT event 36 is executed, it unlocks the scheduling lock. This causes RT scheduler 30 to preempt the idle task and execute RT task 34 previously awakened by RT interrupt handler 32. RT task 34 will perform whatever processing is appropriate. In the example, it would process the audio/video data captured by the audio/video device. As part of its execution, RT task 34 may awaken other RT tasks 34 causing them to execute in turn. Eventually, all RT tasks 34 complete their processing, and thus block waiting for another signal to trigger their execution. At this point the idle task regains control. The idle task was executing the event handler at the time it was preempted. It returns to VMM 26, completing the execution of the event. VMM 26 returns the system to VM mode 40 to resume normal system operation.

This completes the cycle. Windows® schedulers 41 are back in control, all RT tasks 34 are blocked, and RT scheduler 30 believes the idle task is executing. Another interrupt starts the cycle all over again. It is clear that the implementation detail is readily apparent to one skilled in the art based upon the detailed and operational description herein.

An important property of the present invention is that RT tasks execute in VxD event mode. Because event mode has precedence over all Windows® applications and DOS virtual machines, RT tasks are free of the scheduling problems caused by them. On the other hand, programs in event mode are free to take advantage of all services provided by the VMM. Thus RT tasks in this invention are not subject to the substantial restrictions placed on VxD interrupt mode.

What has been described is a method and apparatus for embedding a real-time multi-tasking kernel in a non-real-time operating system. Through use of the VxD programming environment, the present invention supports real time scheduling of real-time tasks involving the processing of communications and natural data types.

While certain exemplary embodiments have been described in detail and shown in the accompanying drawings, it is to be understood that such embodiments are merely illustrative of and not restrictive on the broad invention, and that this invention not be limited to the specific arrangements and constructions shown and described, since various other modifications may occur to those ordinarily skilled in the art.

What is claimed is:

1. A method for processing natural data type information, including audio and video data, without allowing other operations from preempting said processing until said processing is completed, said method comprising the steps of:

invoking a real-time interrupt handler in a VxD interrupt mode of a VxD environment in response to a signal received indicating that natural data type information are to be processed;

disabling a real-time scheduler embedded in said VxD environment while a plurality of real-time tasks for processing said natural data type information are invoked by said real-time interrupt handler, said plurality of real-time tasks being invoked for execution in a VxD event mode of said VxD environment by said real-time scheduler when said real-time scheduler is enabled;

scheduling a real-time event for enabling said disabled real-time scheduler; and executing said plurality of real-time tasks for processing said natural data type information, said executing being performed by said enabled real-time scheduler in said VxD event mode.

2. The method of claim 1 further comprising the steps of:

creating real-time tasks to handle communication or natural data types captured or processed for a playback; and scheduling said real-time tasks, said scheduling performed by said real-time scheduler in said VxD environment.

3. The method of claim 1 further comprising the step of causing a processor to switch from executing in a virtual machine to a VxD interrupt mode, said step performed by a virtual machine manager.

4. The method of claim 1 wherein said signal comprises a hardware interrupt indicating an audio/video capture.

5. The method of claim 1 wherein said signal comprises a graphic user interface application call to indicate an audio/video playback.

6. The method of claim 3 further comprising the steps of:

entering said VxD environment;

executing a real-time interrupt handler in said VxD environment in a VxD interrupt mode;

entering VxD event mode and executing said real-time event; and returning to said virtual machine manager and resuming normal operation in said virtual machine.

7. The method of claim 6 wherein said step of executing said real-time interrupt handler further comprises the steps of:

calling said real-time interrupt handler;

enabling a scheduling lock to prevent said real-time scheduler from switching tasks;

scheduling said real-time event with said virtual machine manager to process said real-time tasks in said VxD event mode; and processing rescheduling to cause all ready real-time tasks to be executed over lower priority idle task.

8. The method of claim 6 wherein said step of entering VxD event mode further comprises the steps of:

unlocking said scheduling lock;

preempting said idle task; and executing said real-time tasks made ready by said VxD interrupt handler.

9. An apparatus for processing natural data type information, including audio and video data, without allowing other operations from preempting said processing until said processing is completed, said apparatus comprising:

a real-time interrupt handler for disabling a real-time scheduler from executing a plurality of real-time tasks in a VxD interrupt mode of a VxD environment while said real-time interrupt handler invokes said plurality of real-time tasks, said plurality of real-time tasks being invoked for execution in a VxD event mode of said VxD environment, said real-time interrupt handler invoked in response to a signal received indicating that natural data type information are to be processed, said signal interrupting normal processing in a virtual machine mode and switching to processing in said VxD interrupt mode;

said plurality of real-time tasks for processing said natural data type information, said plurality of real-time tasks being invoked in said VxD interrupt mode by said real-time interrupt handler and coupled to said real-time interrupt handler;

a real-time event for enabling said disabled real-time scheduler for executing said plurality of real-time tasks in a VxD event mode of said VxD environment, said real-time event coupled to said plurality of real-time tasks; and said real-time scheduler for executing said plurality of real-time tasks in said VxD event mode when enabled, said real-time scheduler coupled to said real-time event.

10. The apparatus of claim 9 further comprising a virtual machine manager for causing a processor to switch from executing in a virtual machine to a VxD interrupt mode.

11. The apparatus of claim 10 further comprising a hardware interrupt for indicating an audio/video capture, signaling said virtual machine manager to cause said processor to switch from executing in said virtual machine mode to said VxD interrupt mode.

12. The apparatus of claim 10 further comprising a graphic user interface application call for indicating an audio/video playback, signaling said virtual machine manager to cause said processor to switch from executing in said virtual machine mode to said VxD interrupt mode.

13. The apparatus of claim 10 further comprising a real-time interrupt handler for calling said real-time task, enabling a scheduling lock to prevent said real-time scheduler from switching tasks, scheduling said real-time event with said virtual machine manager to process said real-time tasks in said VxD event mode, making said real-time tasks ready for execution, and processing rescheduling to cause all ready real-time tasks to be executed over lower priority idle task.

14. The apparatus of claim 10 wherein said virtual machine manager invokes VxD event mode for unlocking said scheduling lock, preempting said idle task, and executing said real-time tasks called by said real-time interrupt handler.

15. An apparatus for processing natural data type information, including audio and video data, without allowing other operations from preempting said processing until said processing is completed, said apparatus comprising:

means for disabling execution of a plurality of real-time tasks in a VxD interrupt mode in a VxD environment while said means for disabling is invoking said plurality of real-time tasks, said plurality of real-time tasks being invoked for execution in a VxD event mode in said VxD environment, said means for disabling invoked in response to a signal received indicating that natural data type information are to be processed, said signal interrupting normal processing in a virtual machine mode and switching to processing in said VxD interrupt mode;

said plurality of real-time tasks for processing said natural data type information and coupled to said means for disabling;

a real-time event for enabling said disabled execution of said plurality of real-time tasks; and means for executing said plurality of real-time tasks in said VxD event mode when said execution of said plurality of real-time tasks is enabled by said real-time event, said means for executing coupled to said real-time event.

16. The apparatus of claim 15 further comprising:

means for creating real-time tasks to handle communication or natural data types captured or processed for a playback; and means for scheduling said real-time tasks, said scheduling performed by said real-time scheduler in said VxD environment.

17. The apparatus of claim 15 further comprising means for causing a processor to switch from executing in a virtual machine to a VxD interrupt mode, said means performed by a virtual machine manager.

18. The apparatus of claim 15 wherein said signal comprises a hardware interrupt to indicate an audio/video capture.

19. The apparatus of claim 15 wherein said signal comprises a graphic user interface application call to indicate an audio/video playback.

20. The apparatus of claim 17 further comprising:

means for entering said VxD environment;

means for executing a real-time interrupt handler in said VxD environment in a VxD interrupt mode;

means for entering VxD event mode and executing said real-time event; and means for returning to virtual machine manager and resuming normal operation in said virtual machine.

21. The apparatus of claim 20 wherein means for executing a real-time interrupt handler further comprises:

means for calling said real-time interrupt handler;

means for enabling a scheduling lock to prevent said real-time scheduler from switching tasks;

means for scheduling said real-time event with a virtual machine manager to process said real-time tasks in said VxD event mode; and means for processing rescheduling to cause all ready real-time tasks to be executed over currently executing idle task.

22. The apparatus of claim 20 wherein means for entering VxD event mode further comprises:

means for unlocking said scheduling lock, preempting said idle task; and means for executing said real-time tasks made ready by said real-time interrupt handler.

23. A computer system for processing natural data type information, including audio and video data, without allowing other operations from preempting said processing until said processing is completed, said system comprising:

a storage element including, a real-time interrupt handler for disabling a real-time scheduler from executing a plurality of real-time tasks in a VxD interrupt mode of a VxD environment while said real-time interrupt handler invokes said plurality of real-time tasks, said plurality of real-time tasks being invoked for execution in a VxD event mode of said VxD environment, said real-time interrupt handler invoked in response to a signal received indicating that natural data type information are to be processed, said signal interrupting normal processing in a virtual machine mode and switching to processing in said VxD interrupt mode, said plurality of real-time tasks for processing said natural data type information, said plurality of real-time tasks being invoked in said VxD interrupt mode by said real-time interrupt handler and coupled to said real-time interrupt handler, a real-time event for enabling said disabled real-time scheduler for executing said plurality of real-time tasks in a VxD event mode of said VxD environment, said real-time event coupled to said plurality of real-time tasks, and said real-time scheduler for executing said plurality of real-time tasks in said VxD event mode when enabled, said real-time scheduler coupled to said real-time event; and a processor for driving said real-time interrupt handler and said real-time scheduler.

24. The system of claim 23 further comprising a virtual machine manager for causing a processor to switch from executing in a virtual machine to a VxD interrupt mode.

25. The system of claim 24 further comprising a hardware interrupt for indicating an audio/video capture, signaling said virtual machine manager to cause said processor to switch from executing in said virtual machine mode to said VxD interrupt mode.

26. The system of claim 24 further comprising a graphic user interface application call for indicating an audio/video playback, signaling said virtual machine manager to cause said processor to switch from executing in said virtual machine mode to said VxD interrupt mode.

27. The system of claim 24 further comprising a real-time interrupt handler for calling said real-time task, enabling a scheduling lock to prevent said real-time scheduler from switching tasks, scheduling said real-time event with a virtual machine manager to process said real-time tasks in said VxD event mode, making said real-time tasks ready for execution, and processing rescheduling to cause all ready real-time tasks to be executed over lower priority idle task.

28. The system of claim 24 wherein said virtual machine manager invokes VxD event mode for unlocking said scheduling lock, preempting said idle task, and executing said real-time tasks called by said VxD interrupt handler.

29. An system for processing natural data type information, including audio and video data, without allowing other operations from preempting said processing until said processing is completed, said system comprising:

means for storing, means for disabling execution of a plurality of real-time tasks in a VxD interrupt mode in a VxD environment while said means for disabling is invoking said plurality of real-time tasks, said plurality of real-time tasks being invoked for execution in a VxD event mode in said VxD environment, said means for disabling invoked in response to a signal received indicating that natural data type information are to be processed, said signal interrupting normal processing in a virtual machine mode and switching to processing in said VxD interrupt mode, said plurality of real-time tasks for processing said natural data type information and coupled to said means for disabling, a real-time event for enabling said disabled execution of said plurality of real-time tasks, and means for executing said plurality of real-time tasks in said VxD event mode when said execution of said plurality of real-time tasks is enabled by said real-time event, said means for executing coupled to said real-time event; and means for processing said means for disabling and said means for executing.

30. The system of claim 29 further comprising:

means for creating real-time tasks to handle communication or natural data types captured or processed for a playback; and means for scheduling said real-time tasks, said scheduling performed by said real-time scheduler in said VxD environment.

31. The system of claim 29 further comprising means for causing a processor to switch from executing in a virtual machine to a VxD interrupt mode, said means performed by a virtual machine manager.

32. The system of claim 31 further comprising means for performing a hardware interrupt to indicate an audio/video capture.

33. The system of claim 31 further comprising means for performing a graphic user interface application call to indicate an audio/video playback.

34. The system of claim 31 further comprising:

means for entering said VxD environment;

means for executing a real-time interrupt handler in said VxD environment in a VxD interrupt mode;

means for entering VxD event mode and executing said real-time event; and means for returning to said virtual machine manager and resuming normal operation in said virtual machine.

35. The system of claim 34 wherein said means for executing a real-time interrupt handler further comprises:

means for calling said real-time interrupt handler;

means for enabling a scheduling lock to prevent said real-time scheduler from switching tasks;

means for scheduling said real-time event with a virtual machine manager to process said real-time tasks in said VxD event mode; and means for processing rescheduling to cause all ready real-time tasks to be executed over lower priority idle task.

36. The system of claim 34 wherein said means for entering VxD event mode further comprises:

means for unlocking said scheduling lock, preempting said idle task; and means for executing said real-time tasks made ready by said VxD interrupt handler.

* * * * *